United States Patent
Leblanc et al.

(10) Patent No.: US 12,512,644 B2
(45) Date of Patent: Dec. 30, 2025

(54) METHOD AND SYSTEM FOR MEASURING CARRIER-TO-ENVELOPE PHASE FLUCTUATIONS OF A FEMTOSECOND LASER PULSE

(71) Applicants: INSTITUT NATIONAL DE LA RECHERCHE SCIENTIFIQUE, Quebec (CA); CENTRE NATIONAL DE LA RECHERCHE SCIENTIFIQUE (CNRS, Paris (FR)

(72) Inventors: Adrien Leblanc, Lacanau (FR); Philippe Lassonde, Montreal (CA); Francois Legare, St-Eustache (CA)

(73) Assignees: INSTITUT NATIONAL DE LA RECHERCHE SCIENTIFIQUE, Quebec (CA); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 793 days.

(21) Appl. No.: 17/783,451

(22) PCT Filed: Dec. 9, 2020

(86) PCT No.: PCT/CA2020/051694
§ 371 (c)(1),
(2) Date: Jun. 8, 2022

(87) PCT Pub. No.: WO2021/113969
PCT Pub. Date: Jun. 17, 2021

(65) Prior Publication Data
US 2023/0028731 A1   Jan. 26, 2023

Related U.S. Application Data

(60) Provisional application No. 62/945,347, filed on Dec. 9, 2019.

(51) Int. Cl.
*H01S 3/13* (2006.01)
*G01J 11/00* (2006.01)
*H01S 3/00* (2006.01)

(52) U.S. Cl.
CPC ............ *H01S 3/1307* (2013.01); *G01J 11/00* (2013.01); *H01S 3/005* (2013.01); *H01S 3/0057* (2013.01); *H01S 3/0092* (2013.01); *H01S 3/0014* (2013.01)

(58) Field of Classification Search
CPC ...... H01S 3/0014; H01S 3/005; H01S 3/0092; H01S 3/1307; G01J 11/00
See application file for complete search history.

(56) References Cited

U.S. PATENT DOCUMENTS

| 7,418,017 B2 * | 8/2008 | Holzwarth | ............... G01J 11/00 372/30 |
| 8,462,427 B2 | 6/2013 | Li | |

(Continued)

OTHER PUBLICATIONS

International Search Report and Written Opinion issued on Feb. 11, 2021 in PCT Application No. PCT/CA2020/051694.

(Continued)

*Primary Examiner* — Michael Carter

(57) ABSTRACT

A method and a system for measuring carrier-to-envelope phase fluctuations (CEP) fluctuations of a laser field, the method comprising focusing laser pulses in a solid-state material for high harmonic generation, collecting a resulting high harmonic spectrum, and inferring a relative phase of the driving field from the high harmonic spectrum. The system comprises a source of CEP stable mid-infrared laser pulses; a CEP variation unit; a solid state medium; a detector; and first focusing optics focusing pulses generated by the source into the solid state medium and second focusing optics collecting resulting harmonics generated in the solid state medium into the detector.

14 Claims, 9 Drawing Sheets

(56) References Cited

U.S. PATENT DOCUMENTS

| | | | |
|---|---|---|---|
| 2011/0080580 A1 | 4/2011 | Fermann et al. | |
| 2011/0274127 A1* | 11/2011 | Masuda | H01S 3/0014 372/38.01 |
| 2019/0356103 A1 | 11/2019 | Vasilyev | |

OTHER PUBLICATIONS

Ishizawa, A. et al., "Evaluation of carrier-envelope phase fluctuation in amplified pulse by using interference between harmonics generated on solid surface", 2005 IEEE LEOS Annual Meeting Conference Proceedings, Oct. 22-28, 2005, Sydney, NSW, Australia, pp. 621-622, Dec. 5, 2005 (Dec. 5, 2005).

Telle, H.IL et al., "Carrier-envelope offset phase control: A novel concept for absolute optical frequency measurement and ultrashort pulse generation", Applied Physics B: Lasers & Optics. 1999, vol. 69 Issue 4, p. 327-332, Sep. 8, 1999 (Sep. 8, 1999).

Leblanc, A., et al. "Characterizing the Carrier-Envelope Phase Stability of Mid-Infrared Laser Pulses by High Harmonic Generation in Solids." Optics Express, vol. 28, No. 12, Jun. 2020, pp. 17161-17170. EBSCOhost, doi:10.1364/0E.388465.

Mehendale, M., et al., Method for single-shot measurement of the carrier envelope phase of a few-cycle laser pulse. Optics Letters, 2000. 25(22): p. 1672-1674.

Apolonski, A., et al., Controlling the Phase Evolution of Few-Cycle Light Pulses. Physical Review Letters, 2000. 85(4): p. 740-743.

Jones, D.J., et al., Carrier-Envelope Phase Control of Femtosecond Mode-Locked Lasers and Direct Optical Frequency Synthesis. Science, 2000. 288(5466): p. 635.

Kakehata, M., et al., Single-shot measurement of carrier-envelope phase changes by spectral interferometry. Optics Letters, 2001. 26(18): p. 1436-1438.

Baltuška, A., T. Fuji, and T. Kobayashi, Self-referencing of the carrier-envelope slip in a 6-fs visible parametric amplifier. Optics Letters, 2002. 27(14): p. 1241-1243.

Baltuska, A., et al., Phase-controlled amplification of few-cycle laser pulses. IEEE Journal of Selected Topics in Quantum Electronics, 2003. 9(4): p. 972-989.

Koke, S., et al., Fast f-to-2f interferometer for a direct measurement of the carrier-envelope phase drift of ultrashort amplified laser pulses. Optics letters, 2008. 33: p. 2545-7.

Takeda, M., H. Ina, and S. Kobayashi, Fourier-transform method of fringe-pattern analysis for computer-based topography and interferometry. Journal of the Optical Society of America, 1982. 72(1): p. 156-160.

Shan, J., et al., Single-shot measurement of terahertz electromagnetic pulses by use of electro-optic sampling. Optics Letters, 2000. 25(6): p. 426-428.

Kim, K.T., et al., Petahertz optical oscilloscope. Nature Photonics, 2013. 7(12): p. 958-962.

Paasch-Colberg, T., et al., Solid-state light-phase detector. Nature Photonics, 2014. 8(3): p. 214-218.

Wittmann, T., et al., Single-shot carrier-envelope phase measurement of few-cycle laser pulses. Nature Physics, 2009. 5(5): p. 357-362.

Tzallas, P., E. Skantzakis, and D. Charalambidis, Measuring the absolute carrier-envelope phase of many-cycle laser fields. Physical Review A, 2010. 82(6): p. 061401.

You, Y.S., et al., High-harmonic generation in amorphous solids. Nature Communications, 2017. 8(1): p. 724.

You, Y.S., et al., Laser waveform control of extreme ultraviolet high harmonics from solids. Optics Letters, 2017. 42(9): p. 1816-1819.

Song, X., et al., Attosecond temporal confinement of interband excitation by intraband motion. Optics Express, 2019. 27(3): p. 2225-2234.

\* cited by examiner

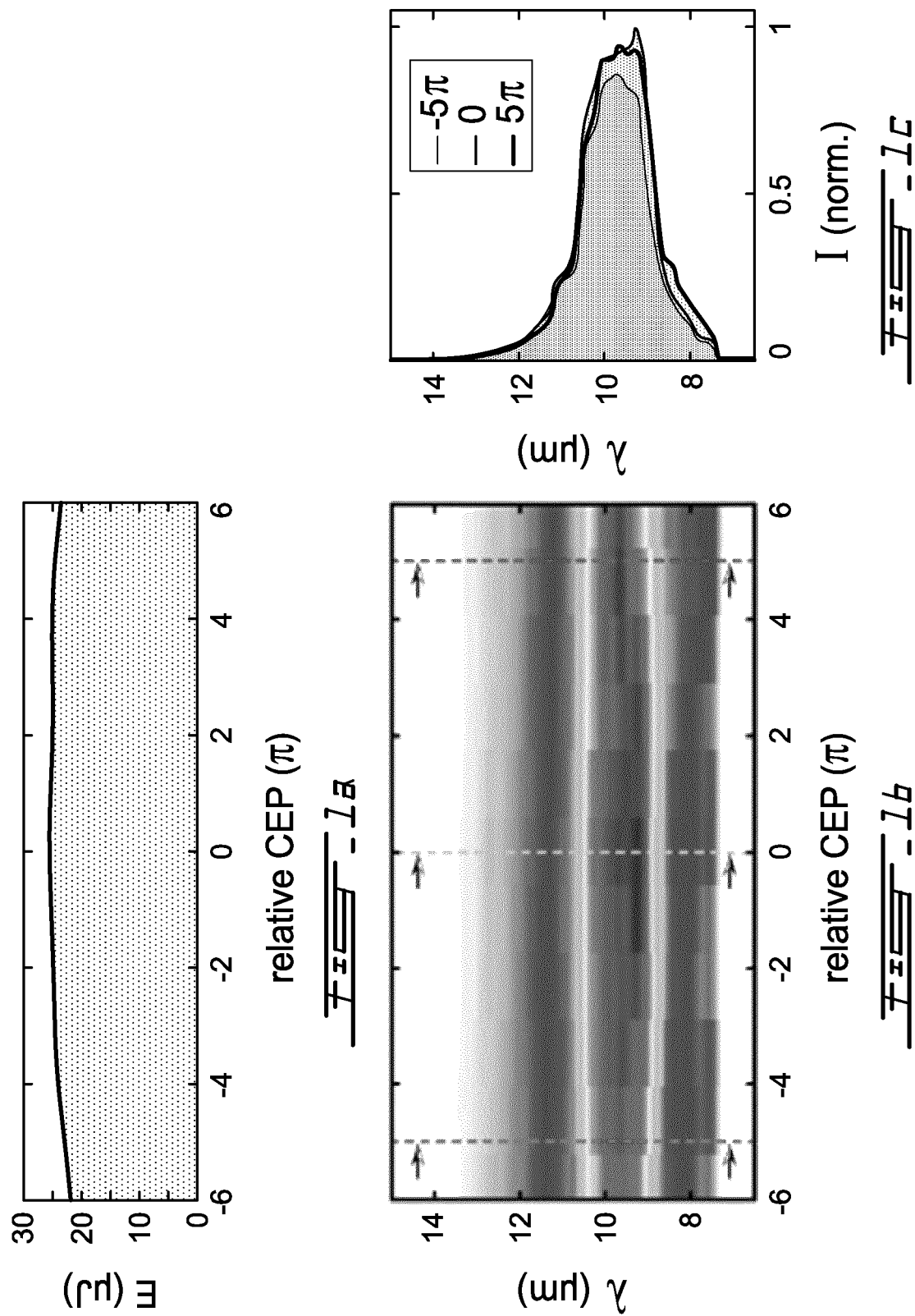

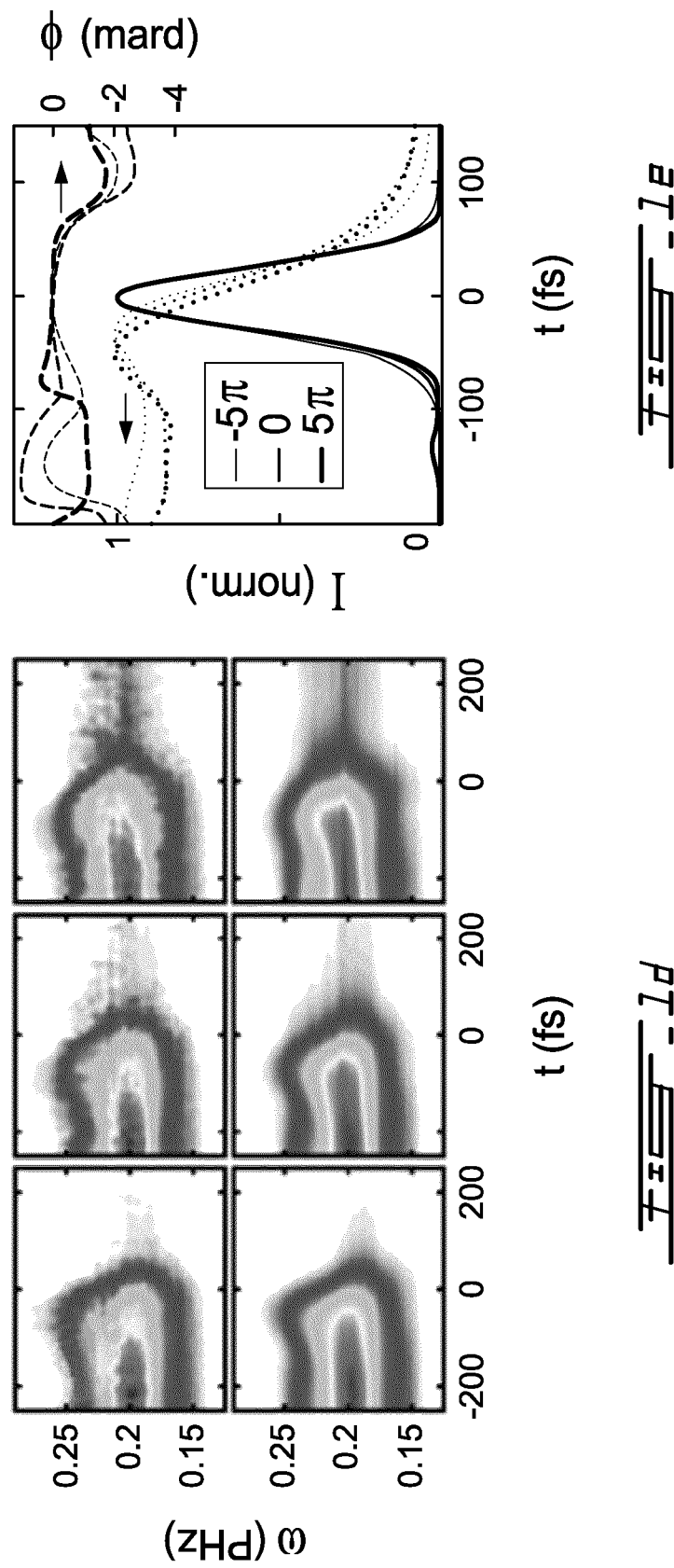

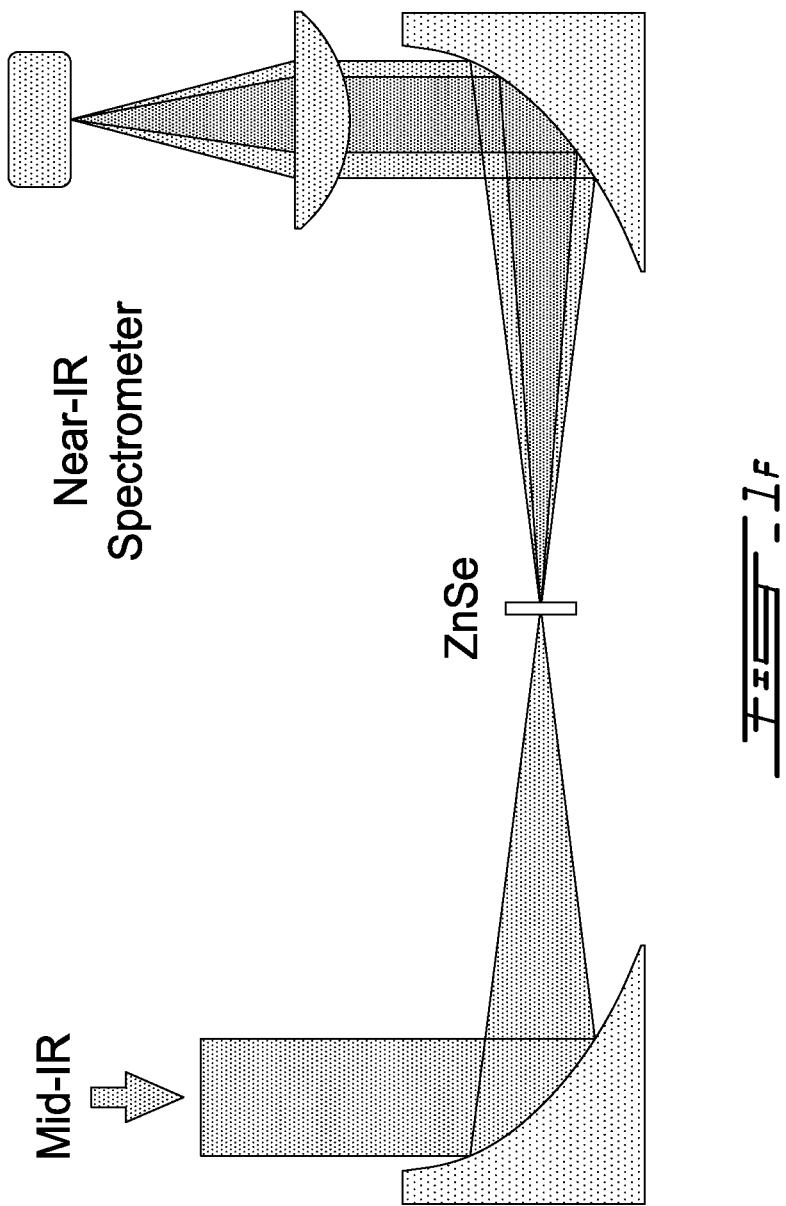

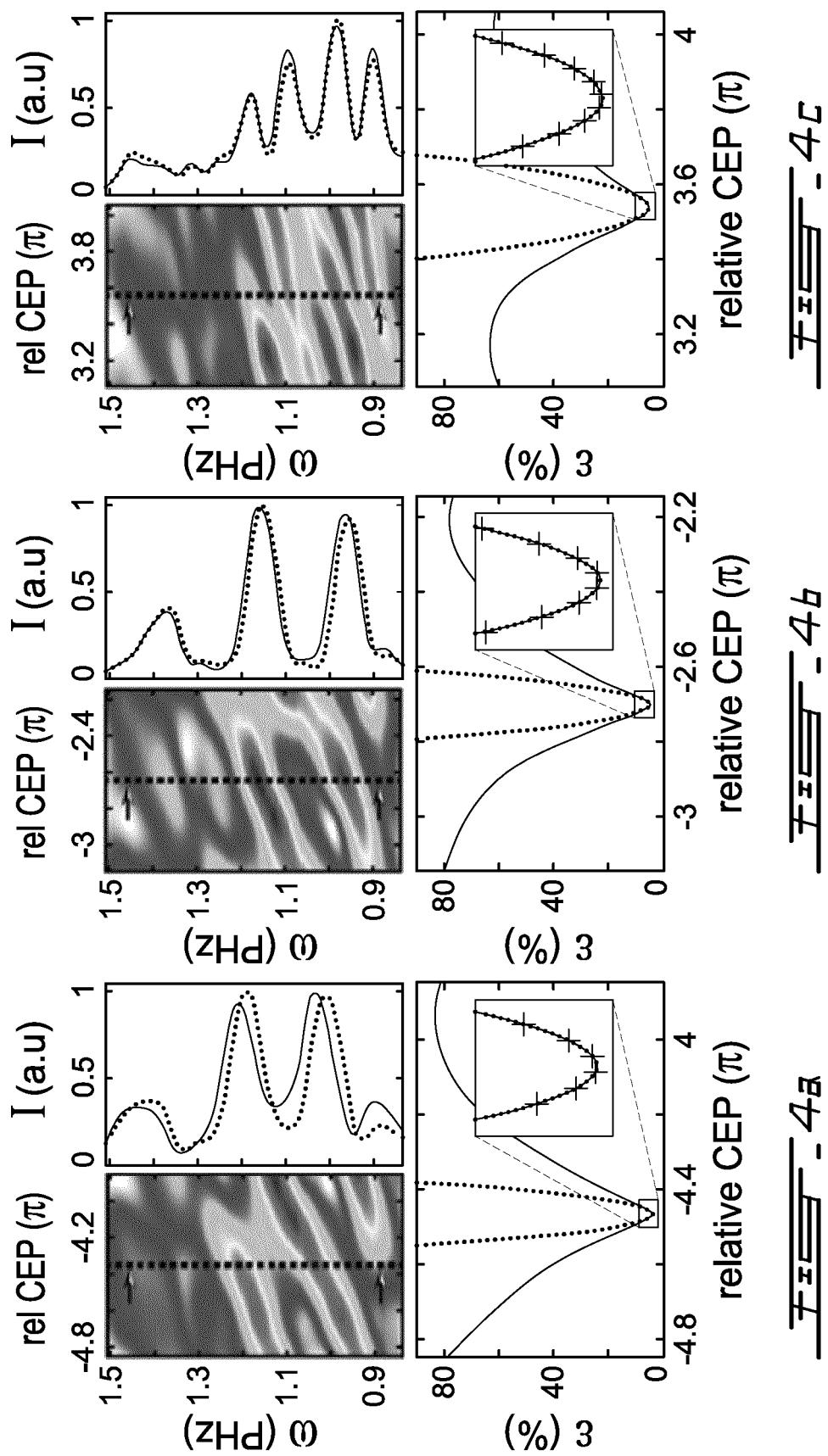

METHOD AND SYSTEM FOR MEASURING CARRIER-TO-ENVELOPE PHASE FLUCTUATIONS OF A FEMTOSECOND LASER PULSE

CROSS-REFERENCE TO RELATED APPLICATIONS

This application is a National Entry Application of PCT application no PCT/2020/051694 filed on Dec. 9, 2020 and published in English under PCT Article 21(2), which itself claims benefit of U.S. provisional application Ser. No. 62/945,347, filed on Dec. 9, 2019.

FIELD OF THE INVENTION

The present invention relates to measuring carrier-to-envelope phase (CEP) fluctuations of a femtosecond laser pulse. More specifically, the present disclosure is concerned with a method and a system for measuring relative carrier-to-envelope phase of femtosecond laser pulses based on high harmonic generation in solids.

BACKGROUND OF THE INVENTION

Optical pulses having a duration of a few femtoseconds or less include only a few optical cycles at a fundamental carrier frequency of the pulse within an envelope of the pulse. A pulse-envelope typically has a Gaussian or Sech-squared shape. The peak power within the envelope depends on the phase of the carrier cycles relative to the envelope, i.e. on the carrier envelope phase (CEP). The highest peak power occurs when a peak of one of the carrier cycles is exactly in phase with the peak of the envelope. The less the number of cycles within the envelope, i.e., the shorter the pulse, the greater is this phase dependence of peak power in the pulse.

Methods for measuring carrier-to-envelope phase fluctuations of a femtosecond laser pulse based on f-to-2f spectral interferometry comprise measuring the spectral interference between a driving field $\phi_0$ generated from a $\chi^{(3)}$ nonlinear process such as supercontinuum generation or third-harmonic generation and an interfering field generated from a $\chi^{(2)}$ nonlinear process such as second-harmonic generation. This interference is sensitive to the absolute phase of the initial field $\phi_0$.

The laser pulse centered at angular frequency $\omega$ can be divided into two arms of an interferometer, and in the first arm, the pulse is frequency doubled to $2\omega$ by second harmonic generation in a nonlinear crystal, while in the second arm, the pulse is spectrally broadened until its spectrum is wide enough to reach the second harmonic spectral range. Alternatively, the f-2f interferometry is achieved by using an in-line geometry, without separating the beam into two arms. In this case, the fundamental field is spectrally broadened through propagation in a nonlinear $\chi^{(3)}$ medium. A dispersive material is then used to introduce a linear chirp in the broad spectrum and to separate the blue and red parts of the octave spanning spectrum in time. The field is then made to propagate through a nonlinear $\chi^{(2)}$ material that frequency doubles the red part of the broad spectrum. As a result, at the output of the interferometer or after the in-line setup, the interfering field is spectrally resolved. At $2\omega$, in the spectral region of the second harmonic, there is spectral interference due to the delay between the $\chi^{(3)}$ and $\chi^{(2)}$ fields, with spectral fringes directly depending on the relative phase between them. The carrier-to-envelope phase (CEP) variation can thus be observed in real-time from the spectral shift of the interference fringes. The position of the interference fringes directly encodes the relative CEP of the laser pulse between values of $-\pi$ and $\pi$. The fringes can be fitted by a sinusoidal function. For example, if the CEP has changed by $-\pi$ or $\pi$, the interference pattern changes from a minimum to a maximum or vice-versa. The relative change of the field CEP can also be tracked by a standard Fourier transform method.

Other methods used for the measurement of the CEP stability include for example single shot electro-optical sampling, PHz optical oscilloscope, solid state light-phase detector, stereo above-threshold ionization and high harmonics generation from gas targets.

There is still a need in the art for measuring CEP fluctuations of a femtosecond laser pulse.

SUMMARY OF THE INVENTION

More specifically, in accordance with the present invention, there is provided a method for measuring carrier-to-envelope phase fluctuations (CEP) fluctuations of a laser field, comprising focusing laser pulses in a solid-state material for high harmonic generation, collecting a resulting high harmonic spectrum, and inferring a relative phase of the driving field from the high harmonic spectrum.

There is further provided a system for measuring carrier-to-envelope phase fluctuations of a laser source, comprising a source of CEP stable mid-infrared laser pulses; a CEP variation unit; a solid state medium; a detector; and first focusing optics focusing pulses generated by the source into the solid state medium and second focusing optics collecting resulting harmonics generated in the solid state medium into the detector.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1A shows mid-IR pulse energy; FIG. 1B and FIG. 1C show mid-IR pulse spectra, for different positions of the relative CEP (relation (2) normalized by $\pi$); FIG. 1D shows experimental (top panels) and reconstructed (bottom panels) frequency-resolved optical switching (FROSt) spectrograms for three different relative CEP positions of $-5\pi$, 0, and $5\pi$; FIG. 1E shows retrieved temporal profiles of the mid-IR pulses in intensity, full thick lines, and phase, dash lines, and of the optical switch [49] in intensity, full light lines; FIG. 1F shows a schematical view of a system for the generation and detection of high harmonics generated in a zinc selenide window;

FIG. 4A, FIG. 4B and FIG. 4C illustrate an example of the extraction of the relative CEP position of a single-shot for the first 3 shots of each measurement presented in the top panels of FIG. 3A, FIG. 3B, and FIG. 3C, top left panel showing a zoom in (±0.4π) around the average position of −4.34π, −2.64π, and 3.567π in panels a, b, and c, of the harmonic spectrogram/average (ω, CEP) illustrated in FIG. 2; the top right panel showing harmonic profile in intensity of the first single-shot measurement, $I_{single-shot}(\omega)$, presented in the top panels of FIG. 3 in solid red line, and the profile of the spectrogram corresponding to the relative CEP positions of −4.34π, −2.64π, and 3.56π in dashed black line (relative CEP position illustrated by the vertical dash line in the left panel), the bottom panel shows difference ε(CEP) in percentage between the single-shot harmonic profile and the spectrogram profiles as a function of the CEP calculated by relation (3); the sub-panel showing how the accurate single-shot relative CEP position is determined by the position of a parabolic fitting around the minimum of difference ε(CEP);

DESCRIPTION OF ILLUSTRATIVE EMBODIMENTS

The present invention is illustrated in further details by the following non-limiting examples.

As part of the present disclosure, a number of difficulties and/or limitations related to f-to-2f spectral interferometry methods for measuring CEP of femtosecond laser pulses, i.e. pulses typically shorter than 1 picosecond, were identified. In particular, generating a stable supercontinuum with at least one octave of spectral bandwidth is not trivial in all conditions and the interference signal between the $\chi^{(3)}$ field, at the shorter wavelength of the supercontinuum, and the $\chi^{(2)}$ field, at the longer wavelength of the supercontinuum frequency doubled through second-harmonic generation, is typically very weak. Especially for pulses in the mid infrared spectral range, with a central wavelength ω in a range between about 2 microns and about 20 microns, the $\chi^{(3)}$ material used for supercontinuum generation is typically in the anomalous dispersion regime, which is detrimental for generating a broad supercontinuum spectrum. Also, if 2ω corresponds to a wavelength above 2.5 μm, which corresponds to a driving field with the CEP stability to be characterized centered above 5 μm wavelength, spectrometers enabling the single shot measurement of the spectrum may not be commercially available. Moreover, spectrometers with high resolution in the near infrared spectral range, at wavelengths above about 1.1 microns, required to resolve the interference fringes, may not be readily available.

Figure 7:
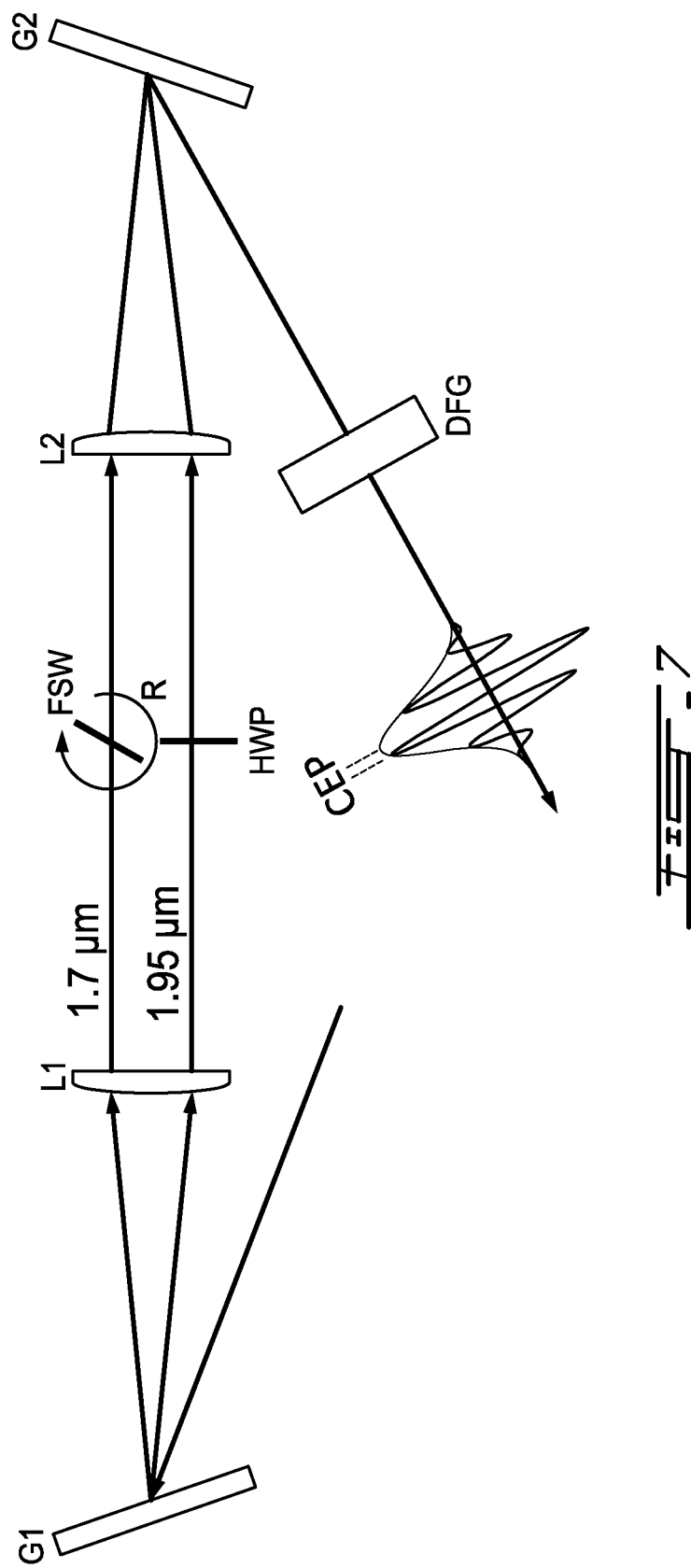
FIG. 7 is a schematic view of a system for generating CEP stable mid-infrared laser pulses and CEP variations according to an embodiment of an aspect of the present disclosure.

In experiments of high harmonic generation (HHG) in a solid described herein, a chirped pulse amplification (CPA) Ti-Sa laser system (femtosecond pulses at a repetition rate of 100 Hz and central wavelength at 800 nm) was used to generate CEP stable mid-IR pulses, by frequency domain optical parametric amplification (FOPA) [47]. As shown in FIG. 7, two spectral slices of broadband 1.8 μm laser pulses are amplified in the Fourier plane and the polarization of the 1.95 μm spectral slice is rotated by a half wave plate (HWP) positioned in the Fourier plane of the FOPA system for shaping the pulses [48]. The relative delay of the 1.7 μm spectral slice is compensated by a fused silica window (FSW) (thickness $d_2$=2 mm and optical index $n_2$=1.4422 at $\lambda_2$=1.7 μm) placed on a rotation stage (R) (CR1-Z7, Thorlabs) at an incident angle of θ (L1 and L2: cylindrical lenses, G1 and G2: gratings). At the output of the FOPA, intrapulse difference frequency generation (DFG) is performed between the two spectral slices, centered respectively at 1.7 and 1.95 μm, in a z-cut gallium selenide (GaSe) crystal (thickness of 750 μm). Finally, a long pass filter (LP6715, Spectrogon) (not shown in FIG. 7) is used to select only the spectral components above 6.7 μm. The generation of high-field CEP stable mid-IR pulses centered at 9.5 μm with a duration of two cycles and an energy of 25.5 μJ, ±3.5% rms, obtained from statistics of single-shot pulse energy measurements was demonstrated [28].

Using intrapulse difference frequency generation (DFG) mechanism for generating CEP stable mid-IR pulses provides passively stabilized CEP in the near-IR [27, 28, 30, 40]. The absolute CEP depends on the relative delay between the two spectral slices involved in the difference frequency generation (DFG) process. In the CEP stable mid-IR FOPA source of FIG. 7, this delay is controlled with the rotation of a compensating window placed in the optical path of one spectral slice of the broadband pulses ([28,48]), thus providing a direct control of the waveform of the mid-IR pulses. Other opto-mechanical or opto-electrical units may be used, such as a glass slide on a rotating stage or a nonlinear crystal for example. The CEP variation is thus integrated into the CEP stable mid-IR source (dotted box 1 in FIG. 5 discussed hereinbelow). Alternatively, variation of the CEP may be achieved outside the source (dotted box 2 in FIG. 5), using for example, a pair of wedges. A first wedge is inserted in the transverse direction of the beam on a translation stage to vary continuously the thickness of the first wedge and change the CEP; and a second, fixed, wedge corrects the beam deviation of the first wedge. The first wedge is made of a dispersive material, selected in the wavelength range of the mid-IR source so that the phase velocity and group velocity of the mid-IR pulse are not equal, thereby enabling to control the relative CEP by changing the propagation distance through the dispersive material.

In the experiments described herein, the mid-IR waveform was tuned by varying the delay between the two spectral slices that drive the difference frequency generation DFG process [28]. The relative phase between the two spectral slices was therefore given by the following relation (1):

$$\Delta \phi = \frac{2\pi}{\lambda_2} \cdot d_2 \left[ n_2 \cos\left(\sin^{-1}(\sin\theta/n_2)\right) - \cos\theta \right] - \frac{2\pi}{\lambda_1} \cdot n_1 d_1 \quad (1)$$

with $d_1$ and $n_1$ the thickness and optical index of the half wave plate at $\lambda_1=1.95$ μm. At $\Delta\phi=0$, for an incident angle $\theta_0$ of about 12°, the difference frequency generation (DFG) process was optimized and the mid-IR pulses energy was maximized. A change in the relative delay translates in a phase shift between the two spectral slices driving the difference frequency generation (DFG). From the optimized position $\theta_0$, the relative CEP of the mid-IR pulses was tuned by slight rotations and could be directly calculated by the phase shift $\Delta\phi(\theta)-\phi(\theta_0)$ between the two spectral slices with relation (2):

$$\text{relative } CEP = \frac{2\pi d_2}{\lambda_2} \cdot \left[\left[n_2\cos(\sin^{-1}(\sin\theta/n_2))-\cos\theta\right]-\left[n_2\cos(\sin^{-1}(\sin\theta_0/n_2))-\cos\theta_0\right]\right] \quad (2)$$

From relation (2), it is deduced that tuning θ from 9° to 13.5° enables to scan over six optical cycles the relative CEP of the mid-IR pulses. This result was verified experimentally, as observed in FIG. 2.

Different properties of the mid-IR laser source as discussed hereinabove in relation to FIG. 7 are presented in FIG. 1. The energy per pulse in FIG. 1A and spectra in FIGS. 1B and 1C are presented as functions of the relative CEP of the mid-IR pulses normalized by π. The spectrometer is based on a CM110 monochromator from Spectral Products, with a HgCdTe (HCT) bolometric detector from Infrared Associates Inc. cooled with liquid nitrogen. In addition, as presented in FIGS. 1D and 1E, the mid-IR pulses are measured temporally for three different relative CEP of −5π, 0, and 5π by frequency-resolved optical switching (FROSt) technique [49] using about 5 μJ of energy of the mid-IR beam focused with a 5 mm off-axis parabola onto a 300 μm thick germanium (Ge) plate. In parallel, the 1.95 μm beam reflected by the long pass filter after the difference frequency generation (DFG) is frequency doubled to about 1 μm by a 2 mm thick type-I BBO crystal. These pulses of about 120 μJ are used to pump the Ge plate to create an optical switch for the frequency-resolved optical switching (FROSt) measurements. The transmitted mid-IR spectra through the Ge plate are measured as a function of the relative delay with the 1 μm pulses. The experimental and reconstructed, with a phase retrieval algorithm [49], spectrograms for the three relative CEP are shown in FIG. 1D. Finally, the temporal intensity and phase profiles are presented in FIG. 1E. The full width at half maximum (FWHM) duration in intensity of the mid-IR pulses are respectively measured to 67, 66 and 64 fs for relative CEP of −5π, 0, and 5π.

Figure 2:
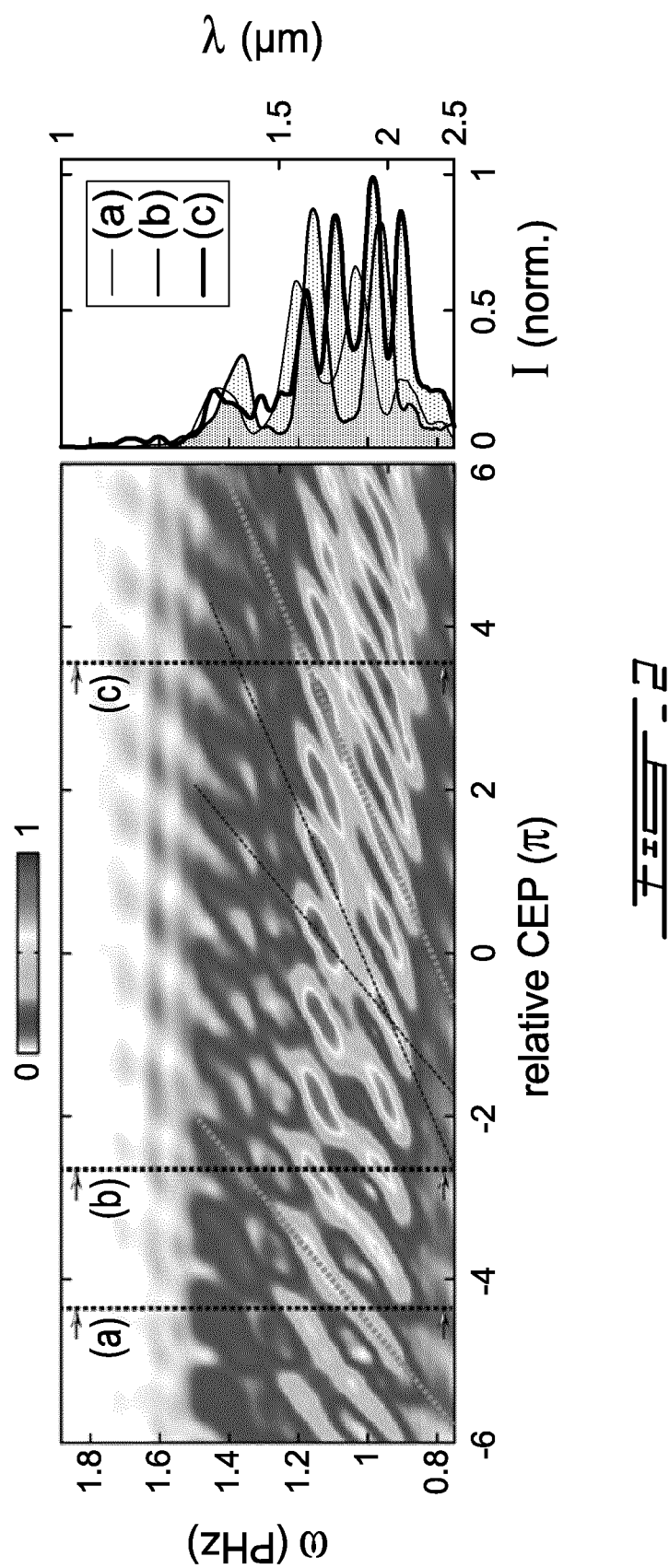
FIG. 2 shows harmonic spectra measured in intensity as a function of the relative CEP of the mid-IR pulses (relation (2) below, normalized by $\pi$); oblique lines highlight the drift in wavelength of the harmonic peaks; the positions of the following three measurements of the CEP fluctuations at a fixed CEP of $-4.34\pi$, $-2.64\pi$, and $3.56\pi$ are respectively represented with the vertical lines (a), (b), and (c); the harmonic profile at these three positions being shown on the right panel.

FIG. 1F shows a system for the generation and detection of high harmonics generated in a zinc selenide window (two off-axis parabolic mirrors of 50 mm focal length, and a 100 mm lens), for characterization of the CEP stability. The mid-IR pulses are directly focused in a zinc selenide (ZnSe) window of 500 μm thickness, for high harmonic generation (HHG), and then the harmonic beam is collected in a spectrometer. The mid-IR field strength at the sample is estimated to about 45 MV/cm (two off-axis parabolic mirrors of 50 mm focal length, and a 100 mm lens). FIG. 2 shows the harmonic spectrogram measured in the spectral range between about 1 and about 2.5 μm, corresponding to harmonic orders from about $4^{th}$ to $10^{th}$, with a near-IR spectrometer (NIR256-2.5, Ocean Optics) as a function of the relative CEP of the driving pulse. Each spectrum results from the average of 200 laser shots (2s). As previously observed [43-45], the harmonic spectra significantly vary with the CEP with a drift in wavelength of the harmonic peaks. Similarly to the half-cycle cut-off from gas phase high harmonic generation (HHG) [50], it is observed that the extension of the high harmonic generation (HHG) spectra from ZnSe depends on the CEP.

Changing the relative phase, and delay, between the two spectral slices (see relation (1)) not only tunes the CEP of the mid-IR pulses but also slightly changes the energy of the mid-IR pulses. For instance, for a relative CEP position of −6π, the energy decreases to about 22 μJ (FIG. 1A). Moreover, as can be observed in FIGS. 1B, 1C and 1E, the pulse spectra and duration are very similar when varying the relative CEP from −6π to +6π. It can be concluded from these measurements that the periodic variation of the harmonic spectra observed in FIG. 2 mainly results from the change of the CEP of the mid-IR pulses and not from variations of their energy, spectra, or duration. These slight changes in the generation of the mid-IR pulses, in energy, spectra, and duration, do not affect the CEP stability of the source, Mich is determined by the stability of the FOPA system, dependent on mechanical vibrations, turbulences, etc. In the present experiment, two different high harmonic generation (HHG) regimes are observed. As shown in the right panel of FIG. 2 (compare for instance the harmonic profiles of FIGS. 1B and 1C), for CEP>2π there are twice as many harmonic peaks than for CEP<−2π. The oblique dash lines in orange in the left panel highlight that in these two regimes, the harmonic peaks drift approximately linearly with the CEP variation [43-45]. The slopes of these drifts with the relative CEP are different because the high harmonic generation (HHG) spectrum shape changes, with twice as many harmonic peaks above a relative CEP of 2π compared to below −2π. Even with this change in the slopes, the period at which the high harmonic generation (HHG) varies with the relative CEP remains π. The two oblique lines are copied at a CEP=0 as a thin dash line to highlight the transition between the two regimes.

Figures 3A, 3B, 3C:
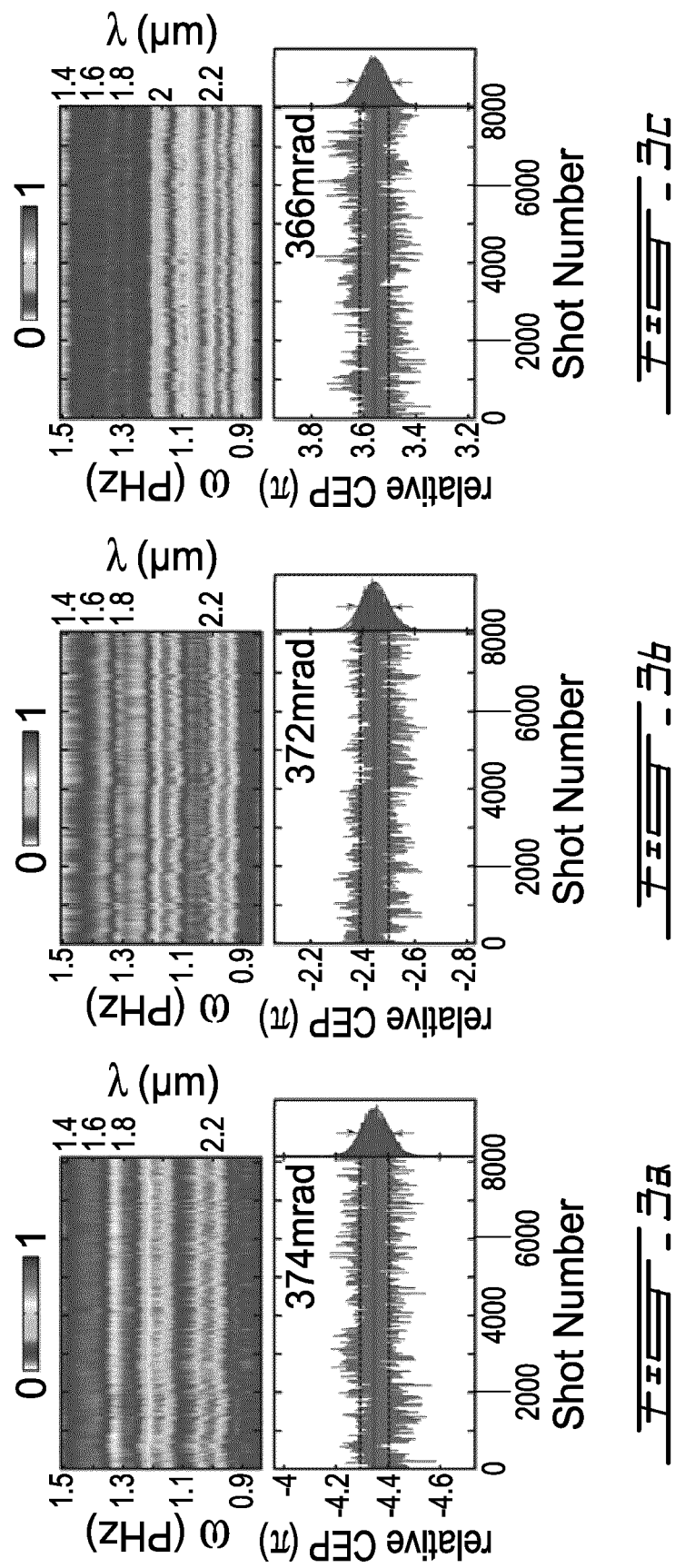
FIG. 3A shows single-shot measurements over more than 8000 shots for a fixed relative CEP position, the compensating window angle being fixed in the source architecture, of −4.34π.
FIG. 3B shows single-shot measurements over more than 8000 shots for a fixed relative CEP position, the compensating window angle being fixed in the source architecture, of −2.64π.
FIG. 3C shows single-shot measurements over more than 8000 shots for a fixed relative CEP position, the compensating window angle being fixed in the source architecture, of 3.56π, respectively corresponding to vertical line (a), (b), and (c) in FIG. 2; intensity spectra being presented in the top panels; in the bottom panels being presented the relative CEP of each shot extracted from the comparison of each single-shot spectrum to the reference spectrogram by the procedure illustrated in FIG. 4; the histogram of the relative CEP distribution being shown at the right of each panel.

While the measurement presented in FIG. 2 demonstrates the CEP stability of the source, to characterize its shot-to-shot fluctuations, single-shot measurements of the harmonic spectrum were performed for a fixed angle f of the compensating window in the 4f-setup and the single-shot spectrum was compared with the reference spectrogram. To demonstrate the validity of this evaluation, this measurement is performed at three different fixed relative CEP positions over the two regimes where the harmonic peaks drift linearly with the CEP. These positions are identified in FIG. 2 by the vertical dashed lines (a), (b), and (c), of respective CEP positions of −4.34π, −2.647π and 3.56π. These single-shot measurements of the harmonic spectrum over more than 8000 shots (80s at 100 Hz) at these three different positions are respectively shown in the top panels of FIGS. 3A, 3B and 3C. The harmonic drift with the CEP variation is only approximately linear in the two regimes due to the wide transition between both. For instance in FIG. 2, at a relative CEP position of −2π, close to the measurement (b), the drift of the most intense high harmonic generation (HHG) peak is not exactly linear as already located in the transition. This complexity in the high harmonic generation (HHG) process does not allow to directly deduce the relative CEP of one shot from the position of the harmonic peaks. Therefore, the Fourier analysis procedures used to extract the relative CEP from the interference pattern obtained by f-2f measurements, where the fringes directly map the relative CEP with a linear drift, cannot be used.

To extract the relative CEP in single-shot, its harmonic spectrum is compared to each spectra of the reference spectrogram (see FIG. 2). This comparison is illustrated in FIG. 4, for the first shots of each three measurements presented in FIG. 3. For a CEP window around the expected relative CEP position, here ±0.4π, the single-shot harmonic profile $I_{single-shot}(\omega)$ (top right panels in FIG. 4), is compared to each profile of the spectrogram $I_{average}(\omega, CEP)$ (top left panels in FIG. 4). The difference ε(CEP) between the single-shot profile and the spectrogram profiles is evaluated using the following relation (3):

$$\varepsilon(CEP) = \sqrt{1 - \frac{\left|\int I_{single-shot}(\omega) \cdot I_{average}(\omega) d\omega\right|^2}{\int |I_{single-shot}(\omega)|^2 d\omega \cdot \int |I_{average}(\omega, CEP)|^2 d\omega}}. \quad (3)$$

The difference ε(CEP) is plotted as a function of the relative CEP in the bottom panels on FIG. 4. The relative CEP of the considered single shot is determined by the minimum of the difference ε(CEP). Instead of considering which profile in the spectrogram $I_{average}(\omega, CEP)$ is the closest to the single-shot profile, the accuracy of the measurement may be improved by a parabolic fitting of the difference ε(CEP) around its minimum value (sub-panels of bottom panels in FIG. 4). This parabolic fitting is only an analysis tool to evaluate the relative CEP with a higher accuracy than the measurement CEP step. This procedure to evaluate the relative CEP is performed for each single-shot spectrum, and the deduced relative CEP as a function of the shot number is illustrated in the bottom panels of FIG. 3. Finally, the CEP fluctuation is evaluated by the full width at half maximum of the Gaussian fit of the histogram of the relative CEP distribution for all shots (FIG. 3). At the relative CEP positions −4.347π (a), −2.647π (b), and 3.567π (c) of FIG. 2, the CEP stability is measured respectively to 374, 372, and 366 mrad, and the CEP fluctuations of the source are determined as 371±4 mrad. While these three measurements are independent, performed over more than 24000 shots, and located in two different regimes of the harmonic drift with the CEP, they provide results that are very similar. This evaluation represents an estimation of the upper limit of the CEP fluctuations. Besides the CEP fluctuations of the source due to the stability of the whole system, there are also energy fluctuations from shot-to-shot, evaluated to ±3.5%, which can slightly affect the high harmonic generation (HHG) process. The addition of these two effects result in an artificial increase of the measured CEP fluctuations compared to the effective CEP fluctuations measurements, as is also the case in f-2f, or f-3f methods [51,52].

The method thus allows measuring the CEP stability of a laser source delivering few-cycle pulses. By using the dependency of high harmonic generation (HHG) in solids on the CEP of the driving pulse, and comparing a single-shot harmonic spectrum to the high harmonic generation (HHG) spectrogram (high harmonic generation (HHG) spectra vs CEP), it is shown that the relative CEP can be measured in single shot, thus the method is sensitive to shot-to-shot fluctuations. Thus high harmonic generation (HHG) in solids is efficiently used to measure the CEP fluctuations of a laser source.

Figure 5:
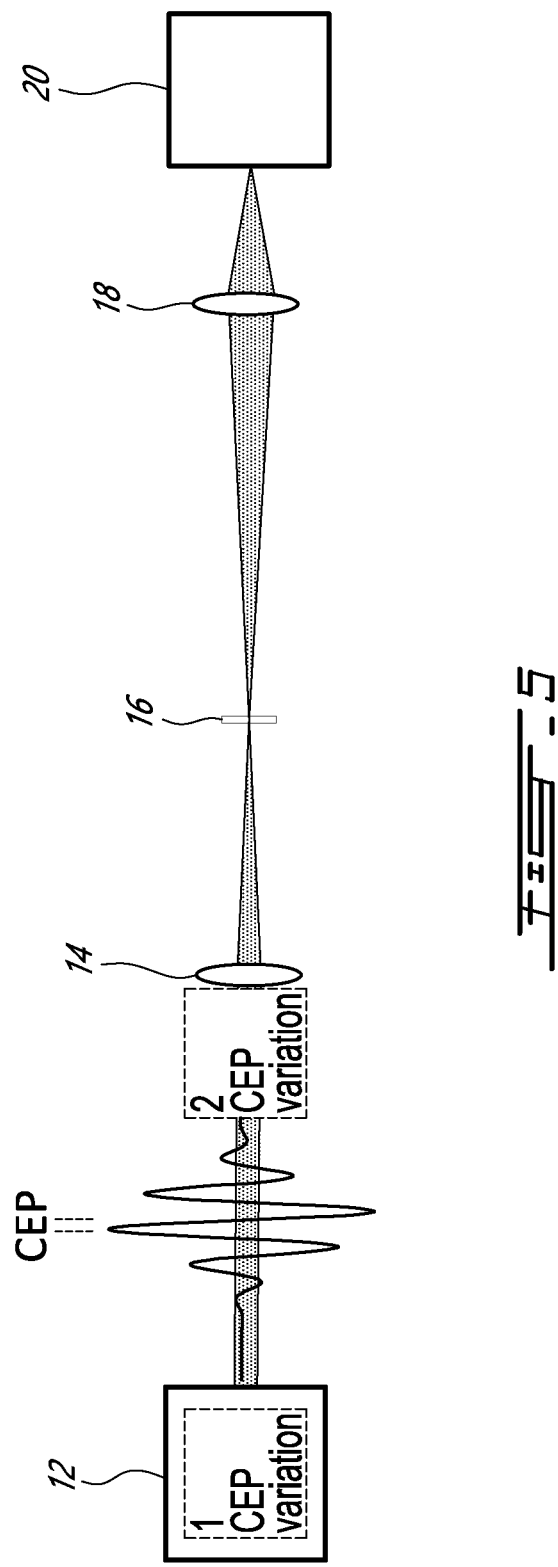
FIG. 5 is a schematic view of a system according to an embodiment of an aspect of the present disclosure.

A system according to an embodiment of an aspect of the present disclosure as illustrated for example in FIG. 5 comprises a source of CEP stable mid-infrared laser pulses 12, a high harmonic generation (HHG) generation medium 16 and a detector 20. Focusing optics 14, 18 are used to focus the pulses to be characterized into the high harmonic generation (HHG) generation solid 16 and to collect the generated harmonics into the detector 20.

The CEP stable laser source is selected to drive the high-order harmonic generation, with an intrinsic root-mean-square CEP fluctuation lower than ±π, a fundamental laser field oscillating with 1 to 20 periods at full width half maximum (FWHM) of the peak amplitude at a central wavelength in a range between about 2 and 300 microns and a pulse energy of at least 1 nJ. It may be a frequency domain optical parametric amplification (FOPA) system as described hereinabove, or an optical parametric amplifier (OPA) or an optical parametric chirped-pulse amplifier (OPCPA), for example. The high harmonic generation (HHG) generation medium is a solid material. Mono crystals, poly crystals, polymorphic materials, and thin films may be selected for example.

The method of the present disclosure may be calibrated by characterizing the complete electric field component of CEP stable laser pulses. In a system as illustrated for example in FIG. 6, CEP stable laser pulses are routed towards a relative CEP phase characterization system 130 as described hereinabove in relation to FIG. 5; they may be also be sent to an absolute CEP measurement system such as an electro optic sampling (EOS) system for example to obtain an absolute reference for the phase variations measured with a system as described hereinabove in relation to FIG. 5. The absolute CEP of the laser pulse can thus be measured in parallel with the acquisition of high harmonic spectra. This way, an absolute reference for the characterization of the carrier-to-envelope phase fluctuations of the laser pulses is obtained.

In summary, CEP fluctuations of femtosecond laser pulses are measured by monitoring the high harmonic generation (HHG) spectrum from solids, for a fundamental laser field oscillating with 1 to 20 periods at full width half maximum (FWHM) of the peak amplitude and a central wavelength in a range between about 2 and about 300 microns. The method comprises focusing the CEP stabilized pulses in a solid-state crystal for generating high harmonics between the 3rd and 100th harmonic orders of the fundamental laser field by interaction with the strong laser field, of intensity of at least $10^{11}$ W/cm$^2$; collecting the high harmonic spectrum (HHG), and inferring the relative phase of the driving field from the high harmonic spectrum since the generated high harmonics have a spectral distribution changing with the driving field CEP. The method comprises recording a reference spectrogram of the high harmonic spectra by measuring the high harmonic generation (HHG) intensity profiles as a function of the CEP of the fundamental laser field, by multishot measurement in order to average over the pulse fluctuations in CEP and/or intensity, averaged over a number of samples between 1 and $10^6$ for each CEP value, the CEP values being sampled by incremental steps between π/2 to π/$10^4$ (FIG. 1A). Then, the high harmonic generation (HHG) spectrum is measured without modifying the CEP at fixed CEPs in single shot and each individual intensity profile is compared with the profiles of the reference spectrogram as a function of the CEP. The difference between the single shot profiles and the profiles of the reference spectrogram is evaluated, and the profiles yielding the lowest difference are selected to determine the CEP fluctuation per shot. The difference can be evaluated by several approaches, such as Fourier transform method, position of the harmonic peaks, root mean square of the difference between the profiles, autocorrelation of the reference profile, etc. Statistical values such as the standard deviation from the distribution of CEP values obtained may be extracted from the CEPs thus obtained individually to determine the CEP fluctuations of the fundamental laser field (FIGS. 1D and 1E).

The method may be applied for measuring the relative phase of consecutive or non-consecutive pulses, by repeating the measurement over at least 2 pulses, and up to $10^{12}$ pulses, measured in single-shot (FIGS. 1B and 1C).

The system comprises a CEP stable laser source with an intrinsic root-mean-square CEP fluctuation better than $\pm\pi$ to drive the high-order harmonic generation; an opto-mechanical or electro-optical unit used to change the relative CEP of the fundamental field with values between $-100\pi$ and $100\pi$; and a solid-state material of a thickness in a range between about 0.1 nm and about 1 mm. A focusing optical unit used to concentrate the fundamental field at the surface of the solid-state material for a strong-field interaction between the fundamental field and the solid-state material, the field intensity being at least $10^{11}$ W/cm$^2$, which drives the electronic processes responsible for the high-order harmonic generation; a collecting optical unit is used to collect the harmonic signal emitted from the solid-state material, to a detector.

The opto-mechanical or electro-optical unit may comprise rotating windows, translating wedges, liquid crystals or acousto-optic modulator for example. The collecting optical unit, of numerical aperture (ratio between the beam diameter and the focal distance) selected in the range between 1/1000 and 2/1, may comprise lenses, spherical mirrors, parabolic mirrors or other focusing optics. The detector may be an array of photosensitive detectors, from 1 to $10^7$, spectrometers and balance photodetectors for example, to detect the high harmonic signal or spectra. The detectors are used to monitor the harmonic signal variation.

Figure 6:
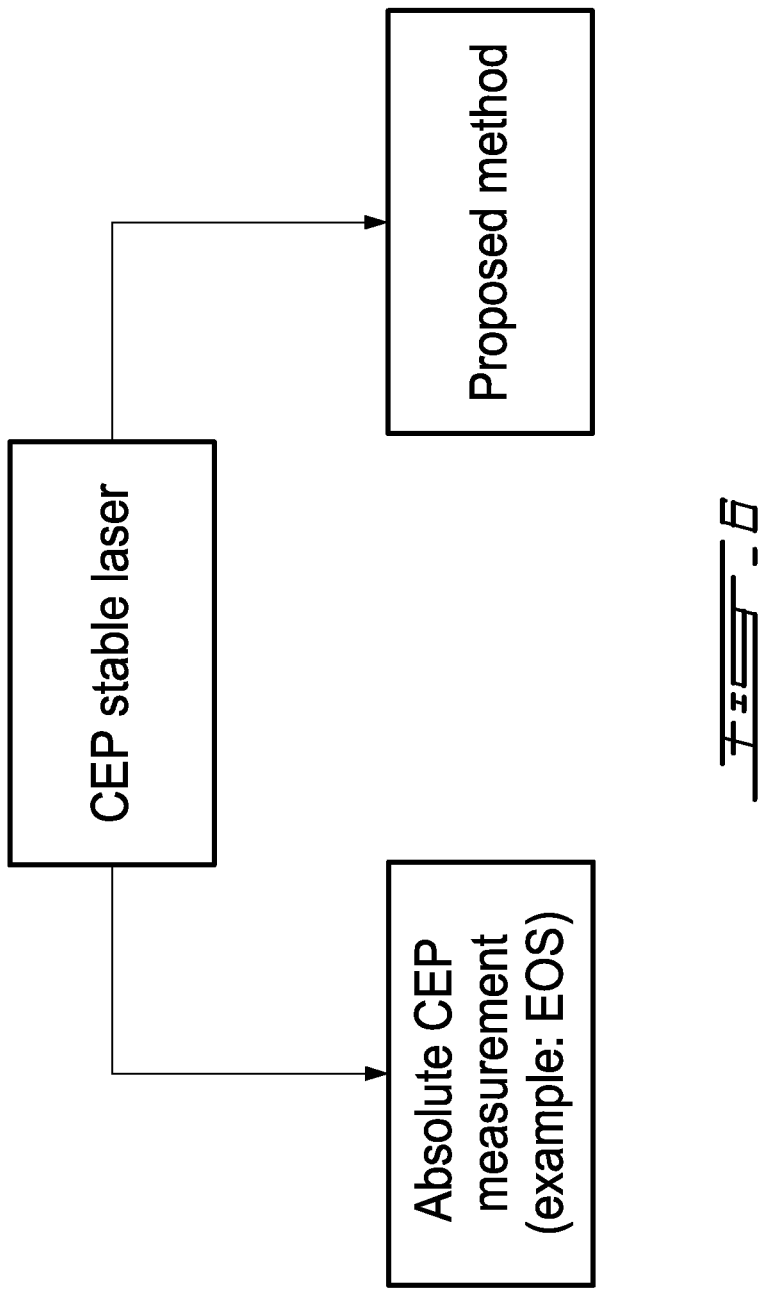
FIG. 6 is a schematic view of a system according to an embodiment of an aspect of the present disclosure.

In the present disclosure, CEP fluctuations of femtosecond pulses are measured by monitoring the high harmonic generation (HHG) spectrum from solids. High harmonic generation (HHG) in solids driven by few-cycle pulses, where the pulse duration is only a small multiple of an optical cycle, is highly sensitive to the CEP. A drift in the shape of the harmonic spectra and position of its peaks is observed while tuning the CEP. There is presented herein a method and a system to track and measure the CEP stability of a laser source using this process. As the position of the harmonic peaks encodes the CEP of the driving pulse, a first measurement is performed to record the harmonic spectrogram as a function of the CEP, averaged over many shots to smooth the effect of remaining CEP fluctuations. In addition, single-shot measurements of the harmonic spectra are taken, and their spectral profiles are compared to the reference spectrogram for the extraction of the relative CEP for every shot. Finally, single-shot measurements over many laser shots enable to evaluate the CEP fluctuations of the source. The proposed method and system are only sensitive to the relative phase variations from shot-to-shot, which provides sufficient information for many applications. To circumvent this limitation, a calibration can be made (FIG. 6).

The present method simplifies drastically the experimental setup compared to interferometry, given that the source has sufficient peak power to drive high harmonic generation from solids. By combining with recent progresses for driving high harmonic generation (HHG) from solids with high repetition rate IR laser systems delivering about 10 nanojoules pulses through the enhancement of the process with nanostructures [46], the method may be applied to characterize the CEP fluctuations of high repetition rate mid-IR laser sources. As based on high harmonic generation (HHG) in solids, the signal to measure is transposed to high orders of the fundamental wavelength, thus allowing for the characterization of the relative CEP of pulses in the mid-IR range since high harmonic generation (HHG) in solids can reach wavelengths towards the near-IR and the visible where ultra-sensitive spectrometers are widely available for single-shot measurements.

The method may be used to characterize the CEP stability of pulses centered at long wavelengths towards the mid-IR, in the range between about 2 and about 20 microns. The method may be extended to other laser wavelength since pulses with sufficient field strengths to generate harmonics in solids are available from the NIR to the THz spectral range [36].

The method can be used for active correction of the CEP drift of a laser source. In case the accurate CEP characterization presented in FIG. 4 is slow due to the time required to compare a single-shot spectrum with multiple spectra contained in the reference spectrogram, the method may be made faster by only considering the position of the maximum of one harmonic peak. While less accurate, this alternative provides an upper limit of the CEP fluctuations thus enabling rapid feedback for the purpose of active correction.

The scope of the claims should not be limited by the embodiments set forth in the examples, but should be given the broadest interpretation consistent with the description as a whole.

REFERENCES

1. A. Wirth, M. T. Hassan, I. Grguras, J. Gagnon, A. Moulet, T. T. Luu, S. Pabst, R. Santra, Z. Alahmed, A. Azzeer, V. S. Yakovlev, V. Pervak, F. Krausz, and E. Goulielmakis, "Synthesized light transients," Science 334(6053), 195-200 (2011).
2. G. G. Paulus, F. Lindner, H. Walther, A. Baltuska, E. Goulielmakis, M. Lezius, and F. Krausz, "Measurement of the phase of few-cycle laser pulses," Phys. Rev. Lett. 91(25), 253004 (2003).
3. F. Lindner, M. G. Schatzel, H. Walther, A. Baltuska, E. Goulielmakis, F. Krausz, D. Milosevic, D. Bauer, W. Becker, and G. G. Paulus, "Attosecond double-slit experiment," Phys. Rev. Lett. 95(4), 040401 (2005).
4. E. Goulielmakis, Z.-H. Loh, A. Wirth, R. Santra, N. Rohringer, V. S. Yakovlev, S. Zherebtsov, T. Pfeifer, A. M. Azzeer, M. F. Kling, S. R. Leone, and F. Krausz, "Real-time observation of valence electron motion," Nature 466(7307), 739-743 (2010).
5. M. Kling, C. Siedschlag, A. J. Verhoef, J. Khan, M. Schultze, T. Uphues, Y. Ni, M. Uiberacker, M. Drescher, F. Krausz, and M. J. J. Vrakking, "Control of electron localization in molecular dissociation," Science 312 (5771), 246-248 (2006).
6. G. Sansone, F. Kelkensberg, J. Perez-Torres, F. Morales, M. F. Kling, W. Siu, O. Ghafur, P. Johnsson, M. Swoboda, E. Benedetti, F. Ferrari, F. Lepine, J. L. Sanz-Vicario, S. Zherebtsov, I. Znakovskaya, A. L'Huillier, M. Y. Ivanov, M. Nisoli, F. Martin, and M. J. J. Vrakking, "Electron localization following attosecond molecular photoionization," Nature 465(7299), 763-766 (2010).
7. H. Li, B. Mignolet, G. Wachter, S. Skruszewicz, S. Zherebtsov, F. Shussmann, A. Kessel, Sergei A. Trushin, N. G. Kling, M. Kübel, B. Ahn, D. Kim, I. Ben-Itzhak, C.-L. Cocke, T. Fennel, J. Tiggesbaumker, K.-H. Meiwes-Broer, C. Lemell, J. Burgdorfer, R.-D. Levine, F. Remacle, and M.-F. Kling, "Coherent electronic wave packet motion in c 60 controlled by the waveform and polarization of few-cycle laser fields," Phys. Rev. Lett. 114(12), 123004 (2015).
8. M. Krüger, M. Schenk, and P. Hommelhoff, "Attosecond control of electrons emitted from a nanoscale metal tip," Nature 475(7354), 78-81 (2011).
9. A. Schiffrin, T. Paasch-Colberg, N. Karpowicz, V. Apalkov, D. Gerster, S. Mühlbrandt, M. Korbman, J. Reichert, M. Schultze, S. Holzner, J. V. Barth, R. Kienberger, R. Ernstorfer, V. S. Yakovlev, M. I. Stockman, and F. Krausz, "Optical-field-induced current in dielectrics," Nature 493(7430), 70-74 (2013).
10. M. Schultze, K. Ramasesha, C. Pemmaraju, S. Sato, D. Whitmore, A. Gandman, J. S. Prell, L. Borja, D. Prendergast, K. Yabana, D. M. Neumark, and S. R. Leone, "Attosecond band-gap dynamics in silicon," Science 346 (6215), 1348-1352 (2014).
11. T. Higuchi, C. Heide, K. Ullmann, H. B. Weber, and P. Hommelhoff, "Light-field-driven currents in graphene," Nature 550(7675), 224-228 (2017).
12. M. Hentschel, R. Kienberger, C. Spielmann, G. A. Reider, N. Milosevic, T. Brabec, P. Corkum, U. Heinzmann, M. Drescher, and F. Krausz, "Attosecond metrology," Nature 414(6863), 509-513 (2001).
13. A. Baltuska, T. Udem, M. Uiberacker, M. Hentschel, E. Goulielmakis, E. Gohle, R. Holzwarth, V. Yakovlev, A. Scrinzi, T. W. Hansch, and F. Krausz, "Attosecond control of electronic processes by intense light fields," Nature 421(6923), 611-615 (2003).
14. G. Sansone, E. Benedetti, F. Calegari, C. Vozzi, L. Avaldi, R. Flammini, L. Poletto, P. Villoresi, C. Altucci, R. Velotta, S. Stagira, S. De Silvestri, and M. Nisoli, "Isolated single-cycle attosecond pulses," Science 314 (5798), 443-446 (2006).
15. L. Xu, C. Spielmann, A. Poppe, T. Brabec, F. Krausz, and T. Hansch, "Route to phase control of ultrashort light pulses," Opt. Lett. 21(24), 2008-2010 (1996).
16. H. R. Telle, G. Steinmeyer, A. Dunlop, J. Stenger, D. Sutter, and U. Keller, "Carrier-envelope offset phase control: A novel concept for absolute optical frequency measurement and ultrashort pulse generation," Appl. Phys. B 69(4), 327-332 (1999).
17. J. Reichert, R. Holzwarth, T. Udem, and T. W. Haensch, "Measuring the frequency of light with mode-locked lasers," Opt. Commun. 172(1-6), 59-68 (1999).
18. A. Apolonski, A. Poppe, G. Tempea, C. Spielmann, T. Udem, R. Holzwarth, T. W. Hansch, and F. Krausz, "Controlling the phase evolution of few-cycle light pulses," Phys. Rev. Lett 85(4), 740-743 (2000).
19. M. Kakehata, H. Takada, Y. Kobayashi, K. Torizuka, Y. Fujihira, T. Homma, and H. Takahashi, "Single-shot measurement of carrier-envelope phase changes by spectral interferometry," Opt. Lett. 26(18), 1436-1438 (2001).
20. B. E. Schmidt, A. D. Shiner, P. Lassonde, J.-C. Kieffer, P. B. Corkum, D. M. Villeneuve, and F. Legare, "Cep stable 1.6 cycle laser pulses at 1.8 µm," Opt. Express 19(7), 6858-6864 (2011).
21. M. Kurucz, S. Toth, R. Flender, L. Haizer, B. Kiss, B. Persielle, and E. Cormier, "Single-shot cep drift measurement at arbitrary repetition rate based on dispersive fourier transform," Opt. Express 27(9), 13387-13399 (2019).
22. J. Moses, S.-W. Huang, K.-H. Hong, O. Mücke, E. Falcao-Filho, A. Benedick, F. Ilday, A. Dergachev, J. Bolger, B. Eggleton, and F. X. Kartner, "Highly stable ultrabroadband mid-ir optical parametric chirped-pulse amplifier optimized for superfluorescence suppression," Opt. Lett. 34(11), 1639-1641 (2009).
23. S.-W. Huang, G. Cirmi, J. Moses, K.-H. Hong, S. Bhardwaj, J. R. Birge, L.-J. Chen, E. Li, B. J. Eggleton, G. Cerullo, and F. X. Kartner, "High-energy pulse synthesis with sub-cycle waveform control for strong-field physics," Nat. Photonics 5(8), 475-479 (2011).
24. Y. Nomura, H. Shirai, and T. Fuji, "Frequency-resolved optical gating capable of carrier-envelope phase determination," Nat. Commun. 4(1), 2820 (2013).
25. Q. Wu and X.-C. Zhang, "Free-space electro-optic sampling of terahertz beams," Appl. Phys. Lett. 67(24), 3523-3525 (1995).
26. S. Keiber, S. Sederberg, A. Schwarz, M. Trubetskov, V. Pervak, F. Krausz, and N. Karpowicz, "Electro-optic sampling of near-infrared waveforms," Nat. Photonics 10(3), 159-162 (2016).
27. D. Sanchez, M. Hemmer, M. Baudisch, S. Cousin, K. Zawilski, P. Schunemann, O. Chalus, C. Simon-Boisson, and J. Biegert, "7 µm, ultrafast, sub-millijoule-level mid-infrared optical parametric chirped pulse amplifier pumped at 2 µm," Optica 3(2), 147-150 (2016).
28. A. Leblanc, G. Dalla-Barba, P. Lassonde, A. Laramee, B. E. Schmidt, E. Cormier, H. Ibrahim, and F. Legare, "High-field mid-infrared pulses derived from frequency domain optical parametric amplification," *Accept. to Opt. Lett.*—https://doi.org/10.1364/OL.389804 (2020).
29. I. Pupeza, D. Sanchez, J. Zhang, N. Lilienfein, M. Seidel, N. Karpowicz, T. Paasch-Colberg, I. Znakovskaya, M. Pescher, and W. Schweinberger, "High-power sub-two-cycle mid-infrared pulses at 100 mhz repetition rate," Nat. Photonics 9(11), 721-724 (2015).
30. C. Gaida, M. Gebhardt, T. Heuermann, F. Stutzki, C. Jauregui, J. Antonio-Lopez, A. Schülzgen, R. Amezcua-Correa, A. Tünnermann, I. Pupeza, and J. Limpert, "Watt-scale super-octave mid-infrared intrapulse difference frequency generation," Light: Sci. Appl. 7(1), 94 (2018).
31. T. Butler, D. Gerz, C. Hofer, J. Xu, C. Gaida, T. Heuermann, M. Gebhardt, L. Vamos, W. Schweinberger, and J. Gessner, "Watt-scale 50-mhz source of single-cycle waveform-stable pulses in the molecular fingerprint region," Opt. Lett. 44(7), 1730-1733 (2019).
32. T. Butler, N. Lilienfein, J. Xu, N. Nagl, C. Hofer, D. Gerz, K. Mak, C. Gaida, T. Heuermann, and M. Gebhardt, "Multi-octave spanning, watt-level ultrafast mid-infrared source," Whys Photonics 1(4), 044006 (2019).
33. N. Ishii, K. Kaneshima, K. Kitano, T. Kanai, S. Watanabe, and J. Itatani, "Carrier-envelope phase-dependent high harmonic generation in the water window using few-cycle infrared pulses," Nat. Commun. 5(1), 3331 (2014).
34. S. M. Teichmann, F. Silva, S. Cousin, M. Hemmer, and J. Biegert, "0.5-key soft x-ray attosecond continua," Nat. Commun. 7(1), 11493 (2016).
35. J. Li, X. Ren, Y. Yin, K. Zhao, A. Chew, Y. Cheng, E. Cunningham, Y. Wang, S. Hu, Y. Wu, M. Chini, and Z. Chang, "53-attosecond x-ray pulses reach the carbon kedge," Nat. Commun. 8(1), 186 (2017).
36. S. Ghimire, A. D. DiChiara, E. Sistrunk, P. Agostini, L. F. DiMauro, and D. A. Reis, "Observation of high-order harmonic generation in a bulk crystal," Nat. Phys. 7(2), 138-141 (2011).
37. G. Vampa, T. Hammond, N. Thire, B. Schmidt, F. Legare, C. McDonald, T. Brabec, and P. Corkum, "Linking high harmonics from gases and solids," Nature 522 (7557), 462-464 (2015).

38. M. Hohenleutner, F. Langer, O. Schubert, M. Knorr, U. Huttner, S. W. Koch, M. Kira, and R. Huber, "Real-time observation of interfering crystal electrons in high-harmonic generation," Nature 523(7562), 572-575 (2015).
39. U. Fruhling, M. Wieland, M. Gensch, T. Gebert, B. Schutte, M. Krikunova, R. Kalms, F. Budzyn, O. Grimm, J. Rossbach, J. Plonjes, and M. Drescher, "Single-shot terahertz-field-driven x-ray streak camera," Nat. Photonics 3(9), 523-528 (2009).
40. A. Baltuska, T. Fuji, and T. Kobayashi, "Controlling the carrier-envelope phase of ultrashort light pulses with optical parametric amplifiers," Phys. Rev. Lett. 88(13), 133901 (2002).
41. H. Liang, P. Krogen, Z. Wang, H. Park, T. Kroh, K. Zawilski, P. Schunemann, J. Moses, L. F. DiMauro, F. X. Kartner, and K.-H. Hong, "High-energy mid-infrared subcycle pulse synthesis from a parametric amplifier," Nat. Commun. 8(1), 141 (2017).
42. C. Manzoni, M. Forst, H. Ehrke, and A. Cavalleri, "Single-shot detection and direct control of carrier phase drift of midinfrared pulses," Opt. Lett. 35(5), 757-759 (2010).
43. Y. S. You, M. Wu, Y. Yin, A. Chew, X. Ren, S. Gholam-Mirzaei, D. A. Browne, M. Chini, Z. Chang, K. J. Schafer, M. B. Gaarde, and S. Ghimire, "Laser waveform control of extreme ultraviolet high harmonics from solids," Opt. Lett. 42(9), 1816-1819 (2017).
44. Y. S. You, Y. Yin, Y. Wu, A. Chew, X. Ren, F. Zhuang, S. Gholam-Mirzaei, M. Chini, Z. Chang, and S. Ghimire, "High-harmonic generation in amorphous solids," Nat. Commun. 8(1), 724 (2017).
45. X. Song, R. Zuo, S. Yang, P. Li, T. Meier, and W. Yang, "Attosecond temporal confinement of interband excitation by intraband motion," Opt. Express 27(3), 2225-2234 (2019).
46. D. Franz, S. Kaassamani, D. Gauthier, R. Nicolas, M. Kholodtsova, L. Douillard, J.-T. Gomes, L. Lavoute, D. Gaponov, and N. Ducros, "All semiconductor enhanced high-harmonic generation from a single nanostructured cone," Sci. Rep. 9(1), 5663 (2019).
47. B. E. Schmidt, N. Thire, M. Boivin, A. Laramee, F. Poitras, G. Lebrun, T. Ozaki, H. Ibrahim, and F. Legare, "Frequency domain optical parametric amplification," Nat. Commun. 5(1), 3643 (2014).
48. G. Ernotte, P. Lassonde, F. Legare, and B. Schmidt, "Frequency domain tailoring for intra-pulse frequency mixing," Opt. Express 24(21), 24225-24231 (2016).
49. A. Leblanc, P. Lassonde, S. Petit, J.-C. Delagnes, E. Haddad, G. Ernotte, M. Bionta, V. Gruson, B. Schmidt, and H. Ibrahim, "Phase-matching-free pulse retrieval based on transient absorption in solids," Opt. Express 27(20), 28998-29015 (2019).
50. C. Haworth, L. Chipperfield, J. Robinson, P. Knight, J. Marangos, and J. Tisch, "Half-cycle cutoffs in harmonic spectra and robust carrier-envelope phase retrieval," Nat. Phys. 3(1), 52-57 (2007).
51. C. Li, E. Moon, H. Wang, H. Mashiko, C. M. Nakamura, J. Tackett, and Z. Chang, "Determining the phase-energy coupling coefficient in carrier-envelope phase measurements," Opt. Lett. 32(7), 796-798 (2007).
52. C. Li, E. Moon, H. Mashiko, H. Wang, C. M. Nakamura, J. Tackett, and Z. Chang, "Mechanism of phase-energy coupling in f-to-2f interferometry," Appl. Opt. 48(7), 1303-1307 (2009).

The invention claimed is:

1. A method for measuring carrier-to-envelope phase (CEP) fluctuations of a laser field, comprising focusing laser pulses in a solid-state material for high harmonic generation, collecting a resulting high harmonic spectrum, and inferring a relative phase of the driving field from the high harmonic spectrum, the method comprising recording reference high harmonic generation intensity profiles as a function of the CEP of the laser field; recording a high harmonic generation spectrum at fixed CEP in single shot; comparing each single shot intensity profile to the reference profiles as a function of the CEP; determining a difference between the single shot profile and the reference profiles; selecting a profile yielding a lowest difference as determining the CEP fluctuations per shot.

2. The method of claim 1, wherein a laser field intensity is at least $10^{11}$ W/cm$^2$ and high harmonics between the 3rd and 100th harmonic order of the fundamental laser field are generated.

3. The method of claim 1, wherein the laser field oscillates with 1 to 20 periods at full width half maximum (FWHM) of the peak amplitude and has a central wavelength between 2 and 300 microns; and the high harmonics are generated between the 3rd and 100th harmonic order of the laser field.

4. The method of claim 1, comprising recording the reference high harmonic generation intensity profiles averaged over 1 to $10^6$ samples for each CEP, as a function of the CEP of the laser field, the CEP being sampled by incremental values between $\pi/2$ and $\pi/10^4$.

5. The method of claim 1, comprising comparing each single shot intensity profile to the reference profiles as a function of the CEP with a numerical fitting method.

6. The method of claim 1, comprising comparing each single shot intensity profile to the reference profiles as a function of the CEP with a numerical fitting method and determining the relative phase by finding the reference profile that provides a best fit with the single-shot profile.

7. The method of claim 1, comprising measuring the relative phase of consecutive or non-consecutive pulses.

8. The method of claim 1, comprising comprising repeating over a number of single shot samples between 2 and $10^{12}$.

9. The method of claim 1, comprising generating high harmonics from the laser field interaction with the solid state material of a thickness in a range between 0.1 nm and 1 mm, wherein the laser field intensity is at least $10^{11}$ W/cm$^2$.

10. The method of claim 1, comprising generating high harmonics from the laser field interaction with one of mono crystals, poly crystals, polymorphic materials, and thin films.

11. The method of claim 1, comprising generating high harmonics having a spectral distribution changing with the laser field CEP.

12. The method of claim 1, comprising generating cep stable laser field by one of frequency domain optical parametric amplification, optical parametric amplification and optical parametric chirped-pulse amplification.

13. The method of claim 1, comprising routing the pulses to an absolute CEP measurement system to obtain an absolute reference for measured phase variations.

14. The method of claim 1, comprising measuring absolute CEP of the laser field in parallel with acquisition of the high harmonic spectra.

* * * * *